Fig. 6
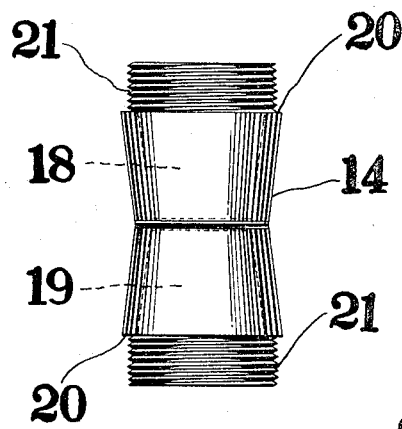
Fig. 7
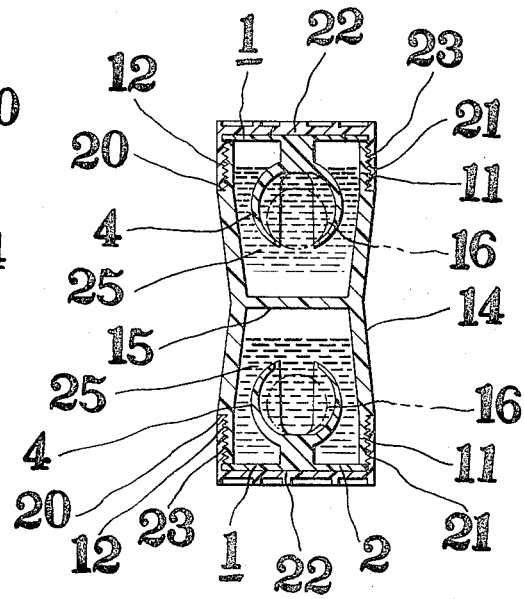
Fig. 8
(a) 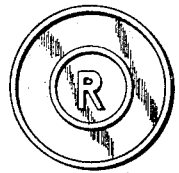 (b) 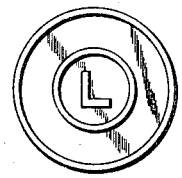
Fig. 9
(a) 
(b) 

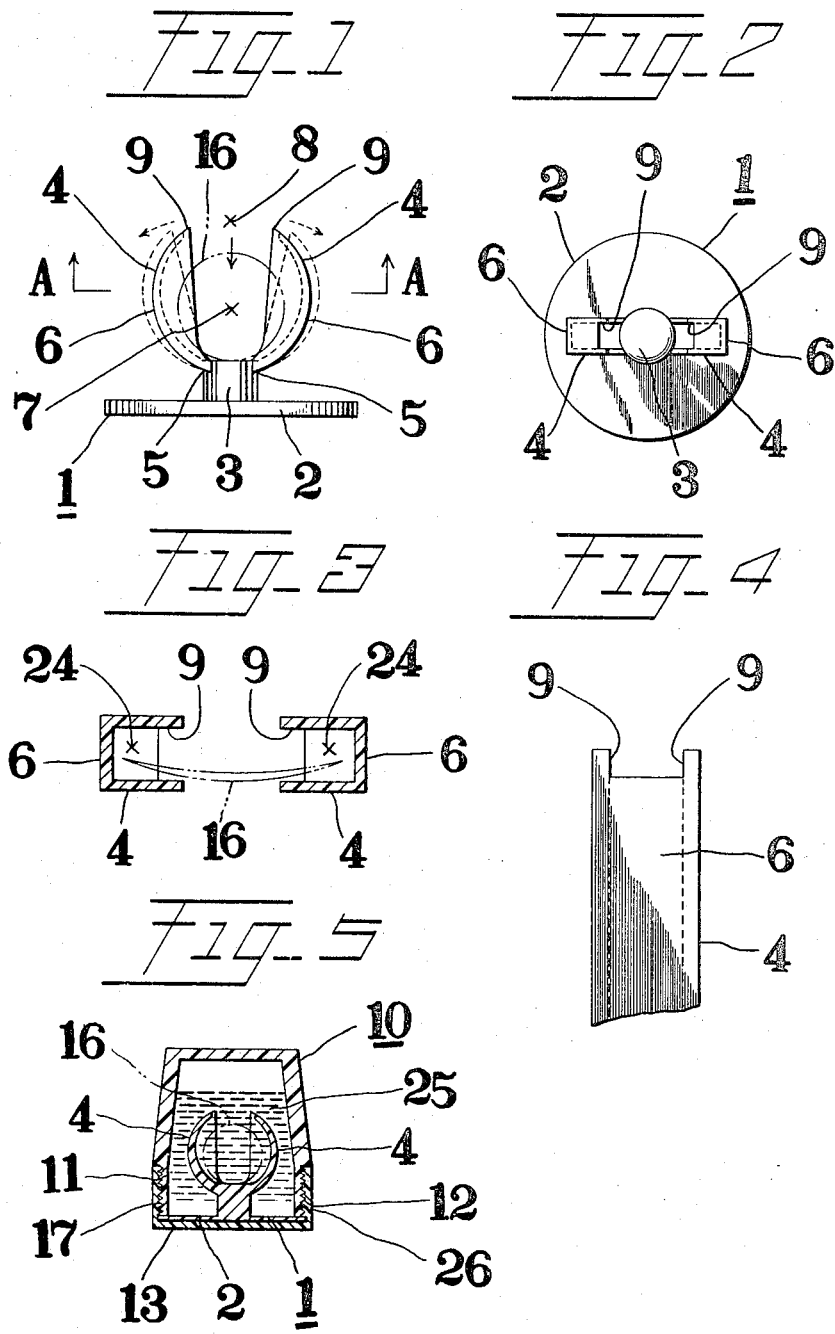

3,367,481
CONTACT LENS HOLDING MEANS FOR A CONTACT LENS STORAGE MEANS
Kyoichi Tanaka, 47-banchi, 2-chome, Yamazoe-cho, Chikusa-ku, Nagoya, Japan
Filed May 31, 1966, Ser. No. 553,833
Claims priority, application Japan, June 5, 1965 (utility model), 40/45,165
3 Claims. (Cl. 206—5)

The present invention relates to a contact lens holding means for a contact lens storage means.

Contact lenses are small transparent plastic resin lenses and are easily lost, broken or damaged. In the use of the conventional contact lens containers, lenses are put on the flat or the curved surfaces which causes lenses to cling to the surface tightly, making it hard to take them out; during removal from the container, the lenses are apt to be damaged in the essential part; when the lids are opened, the lenses pop out and get lost or broken; they are conventionally washed in another container, held by the finger, therefore, they are easily lost or damaged; they are removed from the carrying case into the soaking case and soaked in water or germicidal wetting solution therein until ready for use.

Accordingly, it is the principal object of the present invention to provide improved means for a contact lens container, that is, to provide a combination carrying and soaking case where lenses are easily put and taken out and there is no worry of losing or damaging them; they can be washed or soaked in water or germicidal wetting solution therein. It is also an object of the present invention to provide a contact lens holder made of plastic resin (polyethylene, for instance) whose elasticity and plasticity facilitate their insertion into and removal from the case, thus eliminating danger of losing, breaking or damaging them.

Further objects and advantages of the present invention will be apparent from a study of the following detailed description and from the accompanying drawings of which:

FIGURE 1 is a front plan view of the lens holder;
FIGURE 2 is a top plan view of the holder;
FIGURE 3 is a section taken along the section line A—A of FIGURE 1;
FIGURE 4 is a side plan view of the essential part of FIGURE 1;
FIGURE 5 is a section taken vertically in the center when the holder is applied in the single case;
FIGURE 6 is a front plan view of the double case;
FIGURE 7 is a side plan view of the double case with the lids on;
FIGURE 8(a) (b) is a top plan view of the lids;
FIGURE 9(a) (b) is a conventional contact lens storage means.

Referring more particularly to the accompanying drawings, FIGURE 1 is a contact lens holder of plastic resin fabricated in one piece in single forming operation with moderate elasticity and plasticity. A pair of spaced arms 4 stretches from the column 3 on the circular base 2 leaving a U-shaped concavity 7 betwen them and are free to open at the top 8 thereof because of elasticity of the material. The said arms have a U-shaped contact lens edge receiving grooves 24. The side walls 6 of the arms are so fabricated as to get gradually thicker from the top to the bottom 5 linking them to the column 3. The side walls 6 of the arms 4 are cut at the top thereof providing a U-shaped cavity 9.

Referring to FIGURE 5, which illustrates the single case in application, a bottomed single column case 10 is made of non-transparent hard plastic resin such as an acrylate resin, with its upper part grooved with screw 12 outside. The lid 13 made of non-transparent hard plastic resin is provided with grooves 17 to meet the grooves 12 of the column case 10. After inserting the base 2 of the holder 1 into the lid 13, the grooves 17 of the lid 13 and the grooves 12 of the case 10 are screwed up tight.

Referring to FIGURE 7 which illustrates the double case in application, the column case 14, made of plastic resin, is divided into two parts 18, 19 by a partition 15 with both ends 20 reduced and provided with grooves 21 outside. The inside of the lids 22, 22, made of non-transparent hard plastic resin, are provided with grooves 23 which meet grooves 21 on the cases 18, 19. Holders 1 are inserted into the case 18, 19 as shown in FIGURE 5 in respect to the single case. Front surfaces of the lids show in relief the signs R and L signifying the contact lens 16 for the right and the left eyes, respectively.

To insert the contact lens into the holder, one removes the lid 13 from the case 10 and places the lid so that lens holding arms 4 are turned up and inserts the contact lens 16 from the top space 8 of the arms 4 into the contact lens receiving grooves 24, as shown in FIGURE 1, and presses down the lens 16 with the finger. Then, the contact lens edge will press the edge receiving grooves 24 and bend the arms 4 outwardly at the bottom 5 thereof which links to the column 3 as shown by the dotted line in FIGURE 1. After the diameter of the contact lens passes through the top space 8 between the arms 4, the arms 4 will be restored to the original position owing to elasticity of the bottom 5 thereof, holding securely the lens edge between the grooves 24 of the arms 4; the contact lens is held safely and securely betwen the arms, whether turned upside down or sideways.

When washing or soaking the lens in the case, one puts water 25 into the single case 10 or the double case 18, 19, the lens bearing holder 1 upside down into the water with the lids 13, 22 up, puts the lids 13, 22 and the single case together by means of screws on the lids and the case, and washes the lens, shaking the case while closed tightly. Then one removes the lids from the case, disposes of the water, puts fresh water or germicidal wetting solution into the case 10, 18, 19, seals the case 10, 18, 19 with the lids 13, 22 following the same procedure, and soaks the contact lens 16 in water or germicidal wetting solution in the case 10.

To take out the contact lens 16, one removes the lids from the case, holds with the finger the contact lens 16 edge which is exposed at concavity 7 between the arms 4 of the holder 1, then the contact lens 16 will come off the holder 1 along the grooves 24 pressing the arms 4 outwardly, which will be restored to the original position after the lens is taken out.

During insertion, removal or storage in the holder 1, the essential part of the lens 16 is free from contact with the holder 1 and therefore from damage, because the essential part is held at the concavity 7 between the arms 4.

The present invention is featured by elasticity at the bottom 5 of the arms 4 made of soft plastic resin (polyethylene, for instance) which facilitates both insertion and removal. The contact lens is held safely and securely in position by the arms, eliminating danger of popping out of the holder, getting lost or damaged. When washing the lens, there is no need for another washing vessel; one puts water into the case and shuts tightly with the lids, and washes the lens, shaking the case. Because one need not hold the lens with the finger when washing, there is no worry of loss or damage during washing. Because the case can be shut tightly, the lens can be soaked in water or germicidal wetting solution therein and kept in sanitary conditions. It is a carrying and a soaking case combined.

The present invention is also featured by the cavity 9 at the upper end of the arms 4 by a cut thereon, which holds the lens securely and guides the lens when inserting the lens 16 into the arms 4.

Two holders can be placed side by side on the base in the present invention.

What is claimed is:

1. A contact lens holder comprising a base and a pair of resilient arms supported on said base, said base including an upright column, said arms being spaced apart and affixed to said column to extend upwardly from opposite sides of said column, said arms being provided with curved, oppositely facing U-shaped grooves to receive a lens, said grooves having curved side walls which taper in thickness from the bottom to the top thereof, said side walls being resiliently hinged to the surface of said column whereby said arms can be displaced while receiving a lens and return to their normal positions to retain said lens when the latter is completely inserted in said holder, said grooves having flanges on either side of said walls, said flanges being substantially straight and vertical to define a web between the top and bottom of said side walls whereby a lens can be inserted directly in the tops of said grooves.

2. The lens holder of claim 1, wherein said holder comprises the cap of a container whereby said base is insertable in a lid which is screwed on said container.

3. The lens holder of claim 1 wherein said arms are partly cut out at their upper ends to facilitate the removal and insertion of a lens.

References Cited

UNITED STATES PATENTS

| | | | |
|---|---|---|---|
| 2,540,758 | 2/1951 | Rinnman | 215—43 |
| 2,984,570 | 5/1961 | Prell. | |
| 3,063,083 | 11/1962 | Obitts | 134—143 |
| 3,150,406 | 9/1964 | Obitts | 134/143 |
| 3,211,281 | 10/1965 | Speshyock et al. | 206—5 |
| 3,253,702 | 5/1966 | Ray | 206—5 |

JOSEPH R. LECLAIR, *Primary Examiner.*

THERON E. CONDON, J. M. CASKIE, *Examiners.*